United States Patent
Ratiner et al.

(10) Patent No.: US 8,863,241 B2
(45) Date of Patent: Oct. 14, 2014

(54) SYSTEM AND METHOD FOR MANAGING USAGE RIGHTS OF SOFTWARE APPLICATIONS

(76) Inventors: Michael Ratiner, Holon (IL);
Alexander Aurovsky, Givataim (IL);
Anatoly Hurgin, Caesarea (IL);
Alexander Rubinov, Holon (IL)

( * ) Notice: Subject to any disclaimer, the term of this patent is extended or adjusted under 35 U.S.C. 154(b) by 680 days.

(21) Appl. No.: 13/022,899

(22) Filed: Feb. 8, 2011

(65) Prior Publication Data
US 2012/0204232 A1     Aug. 9, 2012

(51) Int. Cl.
G06F 7/04         (2006.01)
G06F 21/10        (2013.01)

(52) U.S. Cl.
CPC ..................................... G06F 21/10 (2013.01)
USPC ............ 726/4; 726/7; 726/9; 726/26; 726/30;
713/161; 713/165; 713/171; 713/193; 380/259;
380/277

(58) Field of Classification Search
USPC ................................................ 726/4, 9, 7, 30
See application file for complete search history.

(56) References Cited

U.S. PATENT DOCUMENTS

| | | | |
|---|---|---|---|
| 2002/0170052 A1* | 11/2002 | Radatti | 717/171 |
| 2006/0021057 A1* | 1/2006 | Risan et al. | 726/26 |
| 2006/0059104 A1* | 3/2006 | Ebihara et al. | 705/59 |
| 2007/0058807 A1* | 3/2007 | Marsh | 380/44 |
| 2007/0206709 A1* | 9/2007 | Khermosh et al. | 375/343 |
| 2007/0244824 A1* | 10/2007 | Motley et al. | 705/59 |
| 2007/0256126 A1* | 11/2007 | Erickson et al. | 726/20 |
| 2008/0052772 A1* | 2/2008 | Conrado et al. | 726/10 |
| 2008/0082449 A1* | 4/2008 | Wilkinson et al. | 705/59 |
| 2008/0215468 A1* | 9/2008 | Monsa-Chermon et al. | 705/34 |
| 2008/0285758 A1* | 11/2008 | Chuprov et al. | 380/278 |
| 2009/0031141 A1* | 1/2009 | Pearson et al. | 713/187 |
| 2009/0290850 A1* | 11/2009 | Hickman et al. | 386/94 |
| 2011/0029774 A1* | 2/2011 | Zunke | 713/168 |
| 2011/0093695 A1* | 4/2011 | Pavan et al. | 713/150 |

OTHER PUBLICATIONS

Wang et al, Compatible Digital Rights Management System on Ms Windows Platform, 2009, IEEE, pp. 1-4.*
Dalheimer et al, GenLM: License Management for Grid and Cloud Computing Environment, 2009, IEE, pp. 1-8.*

* cited by examiner

*Primary Examiner* — Luu Pham
*Assistant Examiner* — Jenise Jackson
(74) *Attorney, Agent, or Firm* — Browdy and Neimark, PLLC

(57) ABSTRACT

The present invention disclose a system for securing managing usage rights of plurality of software applications in plurality of client computers devices to be authorized by a server application. The system comprises the following components: at least one client hardware component operatively associated with at least one computer device, said hardware component including at least one control segment and at least one application segment, where the control segment include a processor, communication port, memory and the application segments are arranged to include usage rights information of plurality of software applications and a provider hardware component operatively associated with at least one server, said provider hardware component including at least one control segment and at least one application segment, wherein said control segment include a processor, communication port and a memory, where said application segments are arranged to include software application license information of plurality of clients.

13 Claims, 5 Drawing Sheets

US 8,863,241 B2

SYSTEM AND METHOD FOR MANAGING USAGE RIGHTS OF SOFTWARE APPLICATIONS

BACKGROUND

1. Technical Field

The present invention relates to the field of managements of usages rights of software applications and more specifically to biometric and behavioral user identification.

2. Discussion of Related Art

The known methods in the art for securing the usage right of software applications commonly use a security dongle for each software application or authenticate the software usage though secure communication network. The usage of secure dongle device such as disclosed in US application US20060185020 and US application NO. US20030110388 are cumbersome and not practical as the user is required to have a dongle device for each software application. Using software solutions such as floating license or web based activation, which provide authentication process through the network may not provide enough secure measurements against hackers.

BRIEF SUMMARY

The present invention provides a system for securing managing usage rights of plurality of software applications in plurality of client computers devices to be authorized by a server application. The system comprise at least client hardware component components and at least provider hardware component.

The least one client hardware component is operatively associated with at least one computer device, including at least one control segment and at least one application segment, where the control segment include a processor, communication port, memory and said application segments are arranged to include usage rights information of plurality of software applications.

The least one provider hardware component is operatively associated with at least one server, including at least one control segment and at least one application segment, wherein said control segment include a processor, communication port, memory and said application segments are arranged to include software application license information of plurality of clients;

According to some embodiments of the present invention the client hardware component and the provider hardware component are arranged to exchanges secure data utilizing secure communication protocols over communication data network;

According to some embodiments of the present invention the at least one provider update management usages right data in at least one application segment of at least one client hardware component using secure communication protocols;

According to some embodiments of the present invention the a single client hardware component includes and controls multiple software usage rights to be used in at least one computer device.

According to some embodiments of the present invention the hardware client component is a dongle device having a USB port for connecting the computer device.

According to some embodiments of the present invention the control segment include coprocessor.

According to some embodiments of the present invention the server includes a license database storing clients usage rights information.

According to some embodiments of the present invention the usage right data includes purchasing data, licensing data and version updates data.

According to some embodiments of the present invention the server further transmits executables modules files to the client hardware device through the secure communication.

According to some embodiments of the present invention the hardware provider component is integrated as part of the server computer.

The present invention provides a method for securing and managing usage rights of plurality of software applications in a plurality of client computers devices to be authorized by a server application. said method comprise the steps of:

Connecting at least one client hardware component to client terminal, where said hardware component includes at least one control segment and plurality of application segments and the control segment includes a processor, communication port, memory and said application segments are arranged to include usage rights information of plurality of software application.

Connecting at least one provider hardware component to provider server, said provider hardware component including at least one control segment and at least one application segment, wherein said control segment includes a processor, a communication port, memory and said application segments are arranged to include software application license information of plurality of clients;

Establishing secure communication between the client hardware component and the provider hardware component using public and private keys;

Transferring user requests of purchasing or updating usages rights from the user terminal to the provider server;

allocating application segment in the client hardware component for new purchased software application;

Transferring usage rights data from the provider hardware component to the client hardware component utilizing the established secure communication, wherein the users rights data is recorded at different application segment in the user hardware components device;

According to some embodiments the server further transmits executables modules files to the client hardware device through the secure communication.

According to some embodiments the client creates a temporarily session key during a purchasing or updating session, wherein the dada usages rights are ciphered using said session key.

According to some embodiments after purchasing order is sent, the provider a temporary license is transmitted through electronic messaging service.

According to some embodiments of the present invention an update session includes transmitting hash code of the software application product from the client hardware device to the provider hardware component, where the provider hardware component compares the transmitted hash code to recorded has codes stored at the licenses database.

According to some embodiments of the present invention is disclosed a system for securing software module of provider plurality of client computers devices to be authorized by a server application to provide authentication privileges allowing access to secure network resources. The system comprised of:

At least one client hardware component operatively associated with at least one computer device, said hardware component including at least one control segment and at least one application segment, wherein said control segment include a processor, communication port, memory and said application segments are arranged to include authentication privileges information of plurality of software applications.

At least one provider hardware component operatively associated with at least one server, said provider hardware component including at least one control segment and at least one application segment, wherein said control segment include a processor, communication port, memory and said application segments are arranged to include software application authentication privileges of plurality of clients.

According to some embodiments of the present invention the client hardware component and the provider hardware component are arranged to exchanges secure data utilizing secure communication protocols over communication data network;

According to some embodiments of the present invention the at least one provider update authentication privileges data in at least one application segment of at least one client hardware component using secure communication protocols.

According to some embodiments of the present invention the single client hardware component includes and controls multiple software module authentication privileges to be used in at least one computer device.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
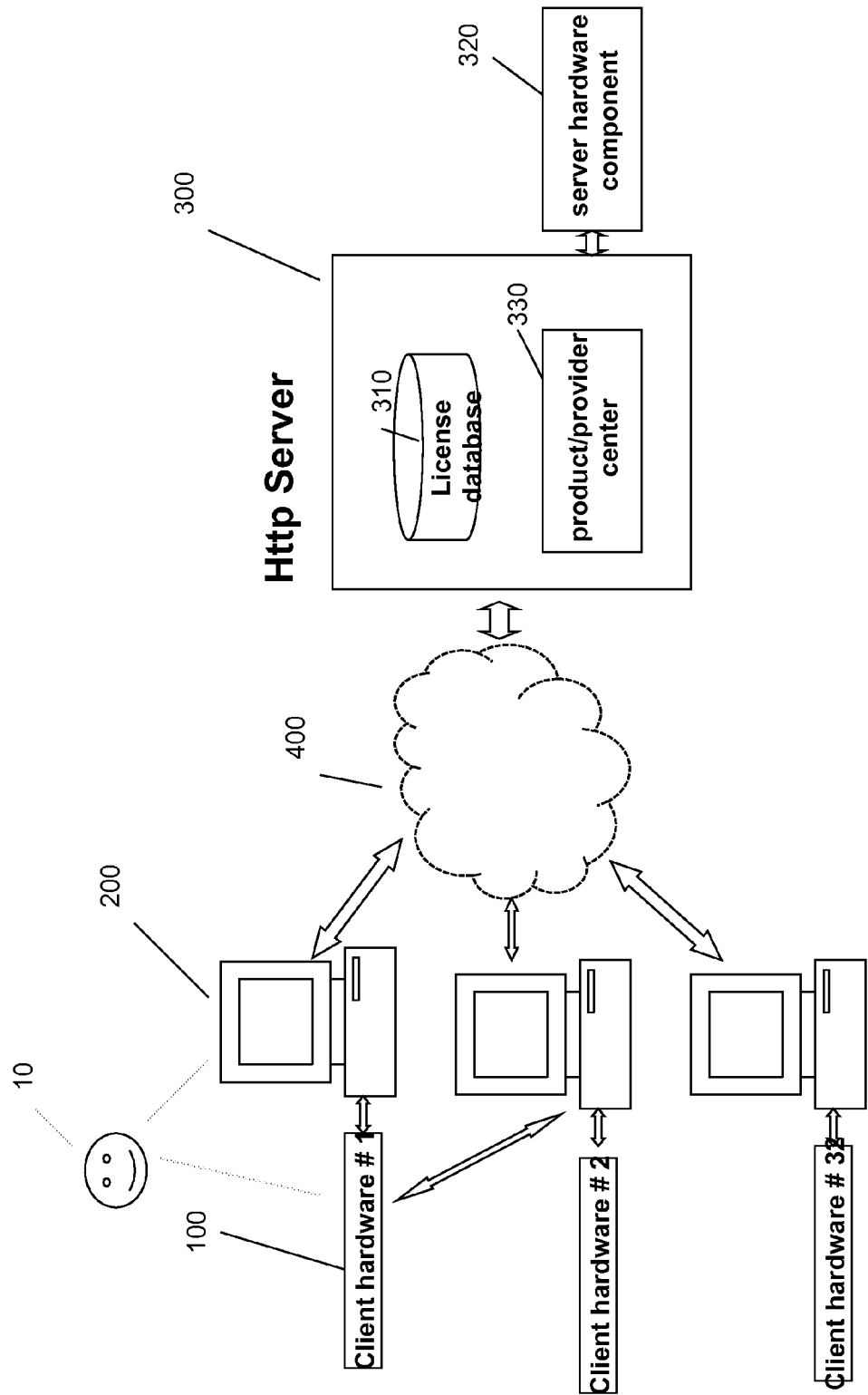
FIG. 1 is block diagram illustrating the components of the software application usage right management system according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a method for purchasing and updating software application usage rights and licenses for client's terminal for multiple providers using a single hardware component for each user. The single hardware component can be used at different computers device, one at a time. In case a single dongle memory is limited and can not store all user's software application he can purchase a second dongle which includes and identification associated with the first dongle, enabling the provider to track user identify and prevent duplications of dongles.

According to some embodiments of the present invention the single hardware component can be used for securing software module of providers at plurality of client computers devices for providing an authentication privileges allowing access to secure network resources, for example authentication privileges allowing access to back accounts.

FIG. 1 illustrates the environment and the components according to some embodiments of the present invention. The user 10 is provided with one client hardware component 100 which is operatively associated with the user computer device 200, optionally the hardware component is a dongle device having USB interface or any other communication interface, for connecting the computer. The computer device 200 is in communication with provider server 300 through data communication network 400. The provider server includes a license database 310, a product center application 330 and is operatively connected with a provider hardware component 320. The provider hardware component can be integrated as part of the provider server or computer device associated with the server.

Figure 2:
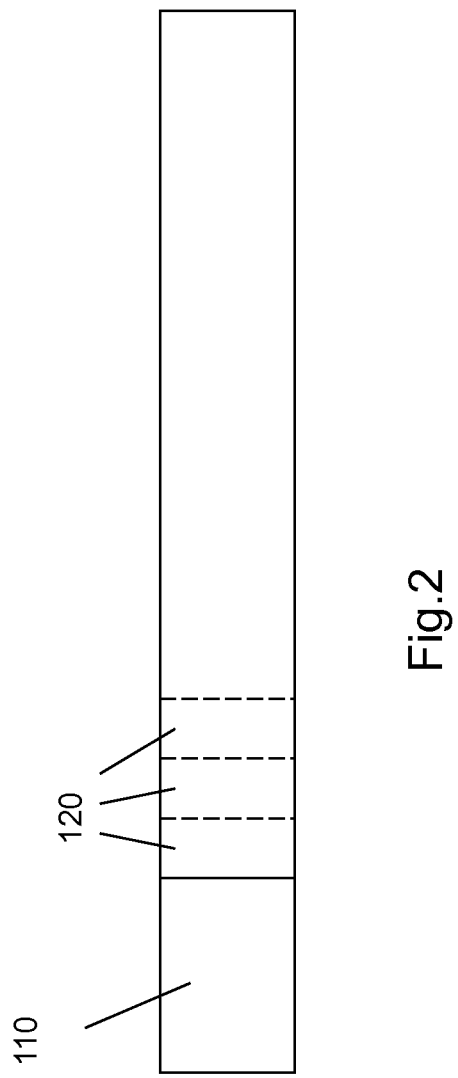
FIG. 2 is block diagram illustrating the hardware component structure according to some embodiments of the invention.

FIG. 2 illustrates logic structure of the hardware component according to some embodiments of the present invention. The client or the provider hardware components includes at least one control segment 110 and plurality of application segments 120. The control segment comprises a processor, a communication port such as USB communication module a memory unit and optionally a coprocessor.

Each application segment includes usages rights data relating one software application such as license data and executable modules. The control segment manages the communication between the client and provider hardware components for receiving the usage right data of software application, allocating application segment and recording to usage right applications at the allocated segment.

According to some embodiments of the present invention it is suggested that the client hardware device is construed and programmed to ensure the software application right and prevent hacking operation of copying, or editing the stored usage data rights information.

Figure 3:
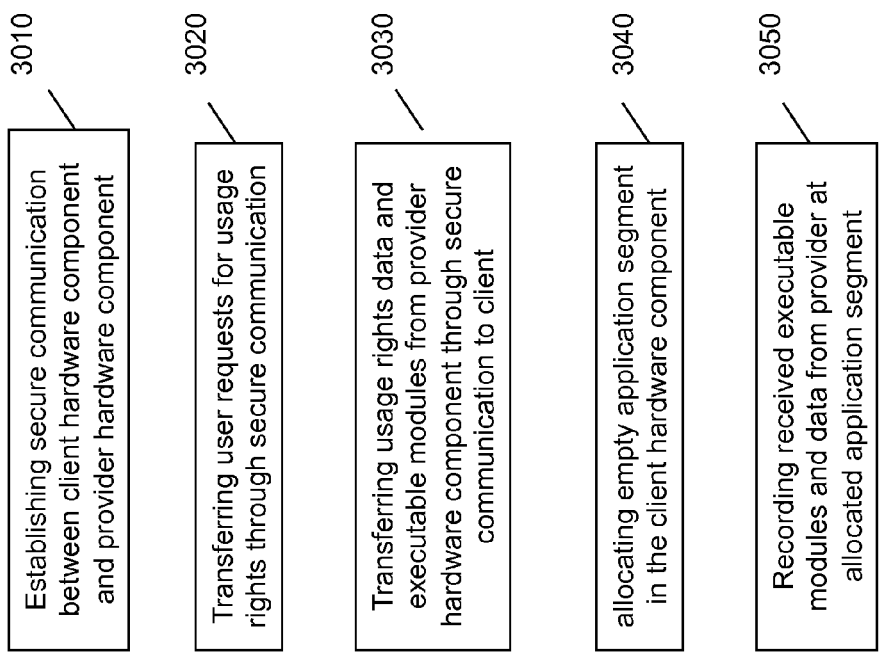
FIG. 3 is an illustration the flow chart of updating usage rights according to some embodiments of the invention.

FIG. 3 illustrates a general flow chart of communication data exchange between the clients and provider hardware components. At the first stage, a secure connection is established between the client and provider device (step 3010), by applying handshake protocols, using public and private keys. Once the secure connection is established the user may request for data of software application usage right enabling him to purchase licenses and update the usage rights relating to providers software applications (step 3020). In response to user's requests, the provider returns software application usages rights data and/or executable modules through the secure connection (step 3030). The exchanged information is secured by ciphering the information using the secure connections protocols. At the client hardware component, an application segment is allocated (step 3040) for each software application and the received information is recorded thereof (step 3050).

Figure 4:
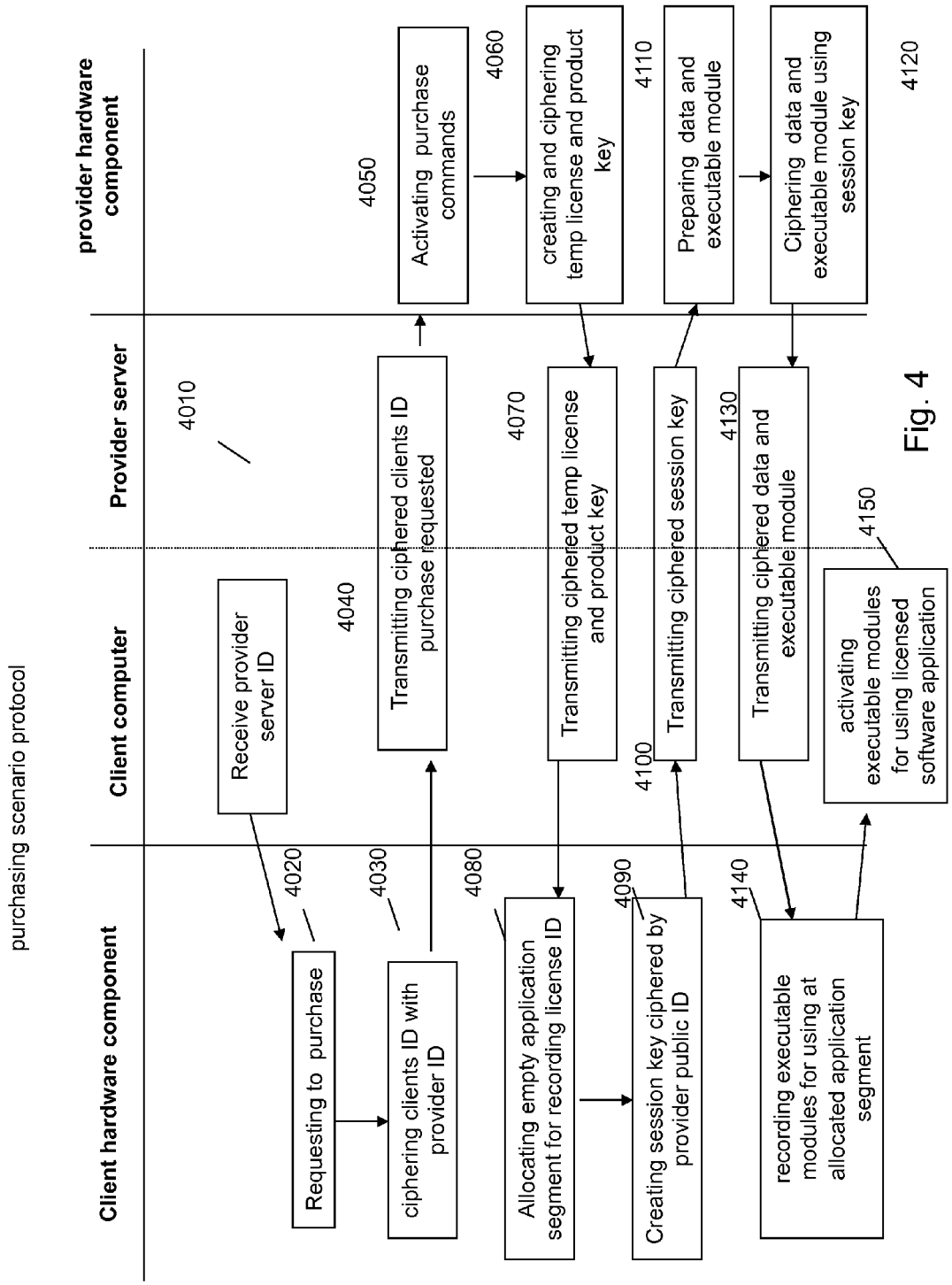
FIG. 4 is an illustration the flow chart of license purchasing process according to some embodiments of the invention.

FIG. 4 illustrates the flowchart of purchasing usage right of software applications according to some embodiments of the present invention. For establishing secure connection between the client and the provider devices, the provider server public ID is transferred from the server to the client computer device and the client hardware component (step 4010). The client can request (step 4030) to purchase usage rights and send information of his request and his pubic ID ciphered by the provider public ID (step 4040). The provider hardware device activates a purchasing program and creates temporary license (steps 4050 and 4060). The temporary license is ciphered by the client public ID and is transmitted back to the client device (step 4070) with the product key using any messaging platform such as Email, SMS etc. The client component hardware device allocates new application segment and records the receive license and product key information (step 4080) at the allocated segment At the next step a session key is created by the client hardware component and is ciphered using the provider public ID (step 4090). The ciphered session ID is transmitted to the provider hardware component (step 4100). At the provider side, are prepared data and executable module (step 4110) for enabling the usage of the purchased application software. The prepared data and modules are ciphered using the session key and are transferred to the client hardware component (step 4130). The received data and modules are recorded at the allocated application segment (step 4140). The client computer device can activate the executable module for installing or updating the purchased software application (step 4150).

Figure 5:
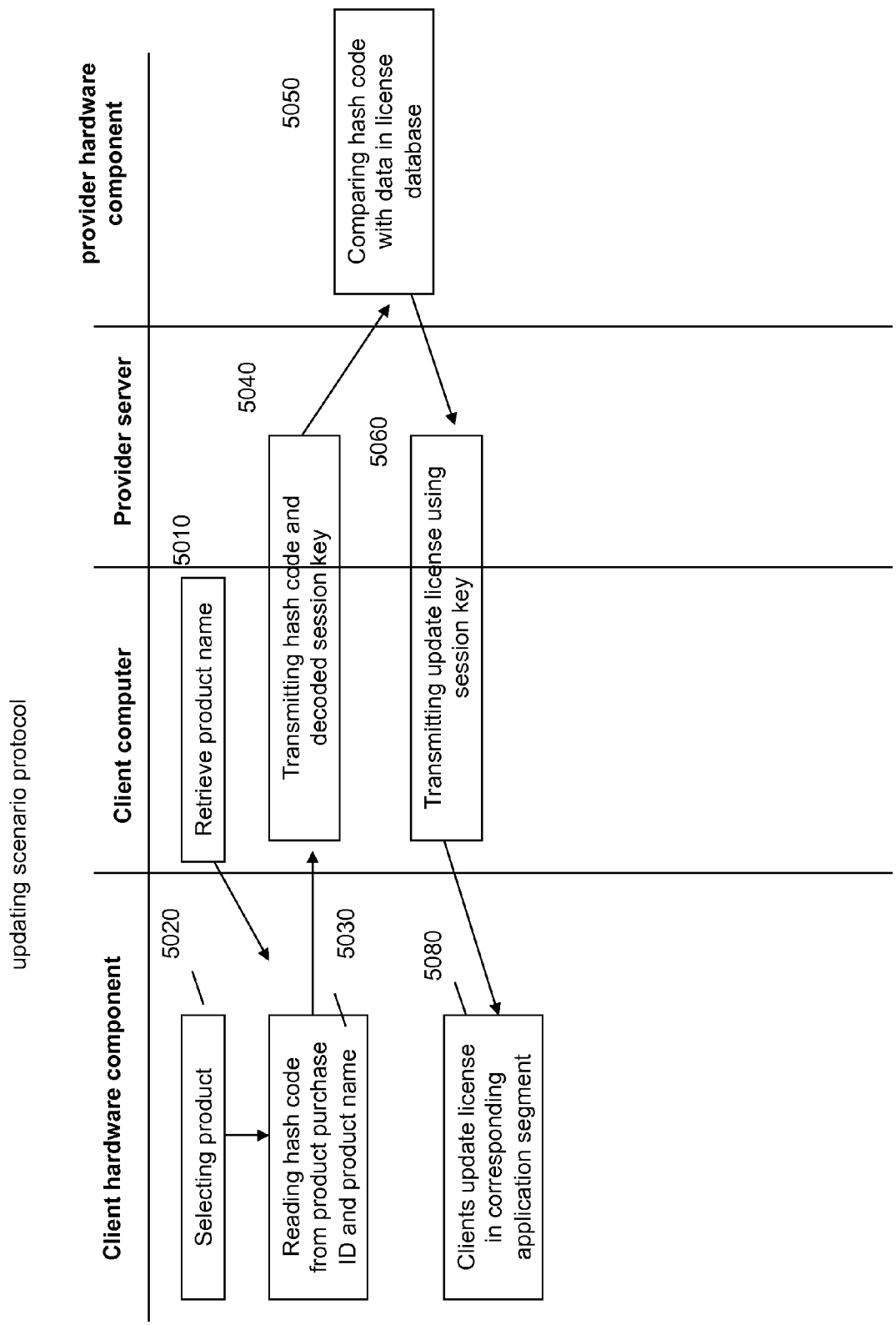
FIG. 5 is a flow chart illustrating updating usage rights according to some embodiments of the invention.

FIG. 5 illustrates the process of updating and licensing scenario protocol according to some embodiments of the present invention. Once the user selects the products to be updated (step 5020), the product name and number is retrieved from the client computer device (step 5010), based on this information the client hardware component, read the hash code from product purchase ID (step 5030) and sends the ciphered information using the provider public ID to the provider hardware component (step 5040). At the provider side the received hash code is compared with hash code at the provider license database (step 5050). In case the codes match, the updated data and/or the license data is sent to the clients device ciphered using session provided by the client (step 5060). At the end of this process the client updates the license in corresponding application segment (step 5080).

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system for securing managing usage rights of a plurality of software applications in a plurality of client computer devices to be authorized by a server application, said system comprising:
   a. at least one client hardware component operatively associated with at least one of the client computer devices, said hardware component including at least one control segment and at least one application segment, wherein said control segment includes a processor, a communication port, and a memory, and said application segments are arranged to include usage rights information related to the plurality of software applications; and
   b. at least one provider hardware component operatively associated with at least one server, said provider hardware component including at least one control segment and at least one application segment, wherein said control segment includes a processor, a communication port, and a memory, and said application segments are arranged to include software application license information relating to a plurality of said client computer devices;
      wherein the client hardware component and the provider hardware component are arranged to exchange secure data utilizing secure communication protocols over a communication data network;

wherein at least one provider update management usage right data in at least one application segment of at least one client hardware component uses secure communication protocols;

wherein a single client hardware component includes and controls multiple software usage rights to be used in the at least one client computer device;

wherein each client computer device creates a temporary session key during a purchasing or updating session, wherein the data usage rights information are ciphered using said session key;

wherein the client hardware device transmits a hash code of at least one of the plurality of software application applications to the provider hardware component, the provider hardware component compares the transmitted hash code to recorded hash codes stored at a provider license database; and wherein the provider hardware component sends the data usage rights information to the client computer device, in response to the transmitted hash code matching the recorded hash code.

2. The system of claim 1, wherein the hardware client component is a dongle device having a USB port for connecting the client computer device.

3. The system of claim 1, wherein the control segment includes a coprocessor.

4. The system of claim 1, wherein the server includes the provider license database storing the data usage rights information.

5. The system of claim 4, wherein the data usage rights information includes purchasing data, licensing data and version update data.

6. The system of claim 1, wherein the server further transmits executable module files to the client hardware component through the secure communication.

7. The system of claim 1, wherein the provider hardware component is integrated as part of the server computer.

8. A method of securing and managing usage rights of a plurality of software applications in a plurality of client computers devices to be authorized by a server application, said method comprising the steps of:

connecting at least one client hardware component to a client computer device, said client hardware component including at least one control segment and a plurality of application segments, wherein said control segment includes a processor, a communication port, and a memory, and said application segments are arranged to include usage rights information related to the plurality of software applications;

connecting at least one provider hardware component to provider server, said provider hardware component including at least one control segment and at least one application segment, wherein said control segment includes a processor, a communication port, and a memory, and said application segments are arranged to include software application license information relating to a plurality of client computer devices;

establishing secure communication between the client hardware component and the provider hardware component using public and private keys;

transferring user requests for purchasing or updating usage rights from the client computer device to the server;

allocating an application segment in the client hardware component for a new purchased software application;

transferring data usage rights information from the provider hardware component to the client hardware component utilizing the established secure communication, wherein the data usage rights information is recorded at a different application segment in the client hardware component;

creating, by the client computer device, temporary session key during a purchasing or updating session, wherein the data usage rights information are ciphered using said session key;

transmitting, from the client hardware device, a hash code of at least one of the plurality of software applications to the provider hardware component, comparing, by the provider hardware component, the transmitted hash code to recorded hash codes stored at a provider license database; and sending, by the provider hardware component, the data usage rights information to the client computer device, in response to the transmitted hash code matching the recorded hash code.

9. method of claim 8, wherein the hardware client component is a dongle device having a USB port for connecting the client computer device.

10. The method of claim 8, further comprising storing, in the provider license database at the server, the data usage rights information.

11. The method of claim 10, wherein the stored data usage rights information includes purchasing data , licensing data and version update data.

12. The method of claim 8, further comprising, transmitting, from the server, executable module files to the client hardware component through the secure communication.

13. The method of claim 8, further comprising, after sending a purchasing order, transmitting a temporary license through an electronic messaging service.

* * * * *